United States Patent [19]
Amano et al.

[11] Patent Number: 5,349,444
[45] Date of Patent: Sep. 20, 1994

[54] VIDEO SIGNAL OUTPUT CIRCUIT WITH ADAPTIVE EQUALIZER

[75] Inventors: Toshio Amano, Kanagawa; Osamu Oda, Saitama; Mitsumasa Saitoh, Kanagawa, all of Japan

[73] Assignee: Sony Corporation, Tokyo, Japan

[21] Appl. No.: 959,663

[22] Filed: Oct. 13, 1992

[30] Foreign Application Priority Data

Oct. 21, 1991 [JP] Japan ................... 3-299516

[51] Int. Cl.$^5$ ........................................... H04N 5/205
[52] U.S. Cl. ........................ 348/711; 360/65;
358/315; 348/607
[58] Field of Search ............... 358/38, 904, 188, 181,
358/166, 37, 195.1, 164, 174; 360/19.1, 65, 33.1;
333/18, 28 R; 375/12, 14; H04N 5/205

[56] References Cited

U.S. PATENT DOCUMENTS 5,033,211  1/1992  Dugan et al. ............... 358/315 X

FOREIGN PATENT DOCUMENTS 56-93494  7/1981  Japan ................... 358/38
62-24779  2/1987  Japan ................... H04N 5/205
4-79677   3/1992  Japan ................... H04N 5/205

*Primary Examiner*—Mark R. Powell
*Attorney, Agent, or Firm*—Lewis H. Eslinger; Jay H. Maioli

[57] ABSTRACT

A video signal output circuit used in a TV set to sample the frequency level of an input video signal so that monitored pictures are automatically optimized in quality. A luminance signal is separated from the input video signal by a Y/C separator. A plurality of bandpass filters whose passing frequencies are $f_1, f_2, f_3, \ldots, f_n$ detect the frequency spectrum of the luminance signal through sampling. The detected values are sent to a controller attached to an equalizer. The equalizer is controlled so that monitored pictures based on the output video signal are optimized in quality.

5 Claims, 2 Drawing Sheets

VIDEO SIGNAL OUTPUT CIRCUIT WITH ADAPTIVE EQUALIZER

BACKGROUND OF THE INVENTION

Recent years have seen numerous kinds of apparatus developed and marketed as video signal sources. For example, ordinary television sets are equipped with many video input terminals for receiving video signals from a video tape recorder (VTR) and optical disk players in addition to broadcast program signals.

The characteristics of the video signal of VTR's sometimes differ from those of optical-disk players (commonly known as laser disk players). For example, the frequency characteristic of the video signal may vary depending on the performance and property of the video apparatus in question. Furthermore, recordings are sometimes made on the medium in such a manner that special visual effects are provided to enhance the contents of the program recorded.

Given these parameters of variation, a video apparatus with fixed video circuit characteristics such as a conventional television sets may not cope sufficiently with diverse video signals coming from external video sources. For example, the screen may turn high-resolution pictures into scenes of unnatural glare, or the screen may show "dulled" pictures lacking visual sharpness.

SUMMARY OF THE INVENTION

It is therefore an object of the present invention to overcome the above-described drawbacks and disadvantages of the prior art and to provide a video signal output circuit that improves the prior art.

In carrying out the invention and according to one aspect thereof, there is provided a video signal output circuit comprising: detecting means for detecting the spectrum of specific frequencies of an input video signal; a signal processing portion for averaging the output of the detecting means using a predetermined time constant; and an equalizer circuit for receiving those frequency level values of the input video signal which are obtained from the signal processing portion; wherein the equalizer circuit performs any one of two operations, one of the two operations being that of flattening the frequency characteristic of the input video signal, the other of the two operations being that of turning a given frequency characteristic into a desired characteristic.

In operation, the video signal output circuit according to the invention detects the frequency spectrum of the luminance signal component in an input video signal check the characteristic of the input video signal and thereby flatten that characteristic through equalizing. This scheme averages monitored pictures in terms of quality so that optimum pictures are always obtained from video signals of different input video sources.

These and other objects, features and advantages of the invention will become more apparent upon a reading of the following description and appended drawings.

DESCRIPTION OF THE PREFERRED EMBODIMENT

Figure 1:
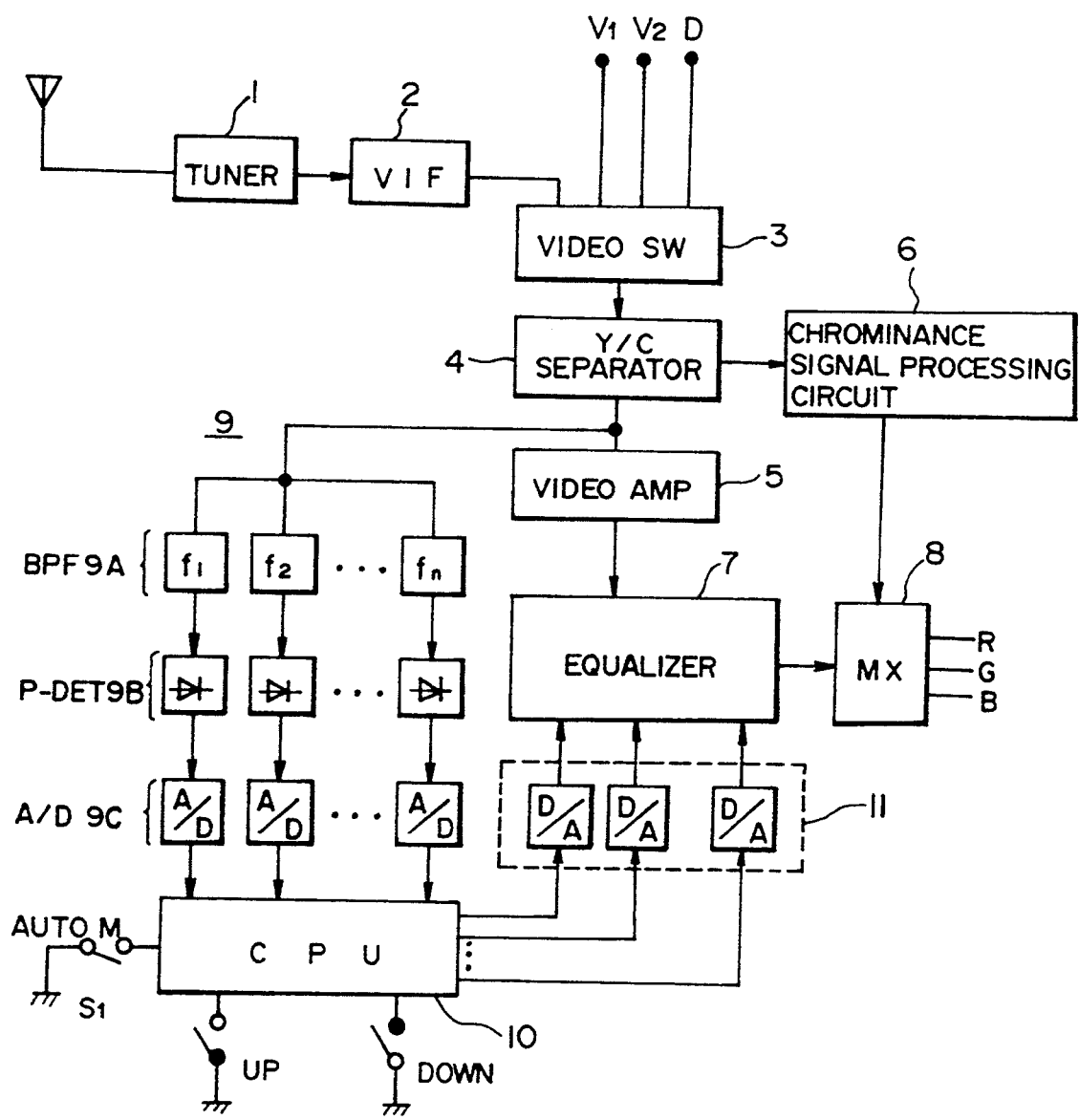
FIG. 1 is a block diagram of a video signal output circuit incorporated in a television set and embodying the present invention.

One preferred embodiment of the invention will now be described with reference to the accompanying drawings. FIG. 1 is a block diagram of a video signal output circuit embodying the invention, the circuit being applied to a television set. In FIG. 1, reference numeral 1 is a tuner (front-end type); 2 is an intermediate amplifier including an intermediate frequency amplifier and a demodulator; 3 is a switching circuit that selects a demodulated video signal or an externally input video signal; and 4 is a Y/C separator that separates the video signal into a luminance signal and a chrominance signal. The luminance signal is fed to a video amplifier 5 and the chrominance signal is supplied to a chrominance signal processing circuit 6.

Reference numeral 7 is an equalizer that, under control of external signals, automatically performs am equalizing operation in response to the characteristic of the input video signal, as will be described later in more detail. The output video signal of the equalizer 7 and the color difference output signal of the chrominance signal processing circuit 6 are supplied to a matrix circuit 8. In turn, the matrix circuit 8 generates primary color signals R, G and B.

The luminance signal separated by the Y/C separator 4 is also fed to detecting means 9 that detects the frequency spectrum the signal. The detecting means 9 comprises a plurality of band-pass filters (BPF) 9A whose passing center frequencies are $f_1, f_2, f_3, \ldots, f_n$; a plurality of detectors 9B that detect the outputs of the band-pass filters 9A and hold the peak values (mean values) of these outputs for a predetermined period of time; and a plurality of A/D converters 9C that subject the outputs of the detectors 9B to A/D conversion for input to a controller 10 made of a microcomputer or the like.

The passing frequency band of each band-bass filter may be selected as desired. For ordinary video signal bands, the number of center frequencies may range from three to seven ($n = = 3 - 7$).

The controller 10 has a changeover switch S1 used to select either automatic or manual control of the frequency characteristic of the video signal. In the manual control mode, visual sharpness control is effected using UP and DOWN keys. In the automatic control mode, D/A converters 11 are supplied with the level control data corresponding to the output levels of the A/D converters 9C. Analog control signals after conversion by the D/A converters 11 are fed to the equalizer 7.

Figure 2A:
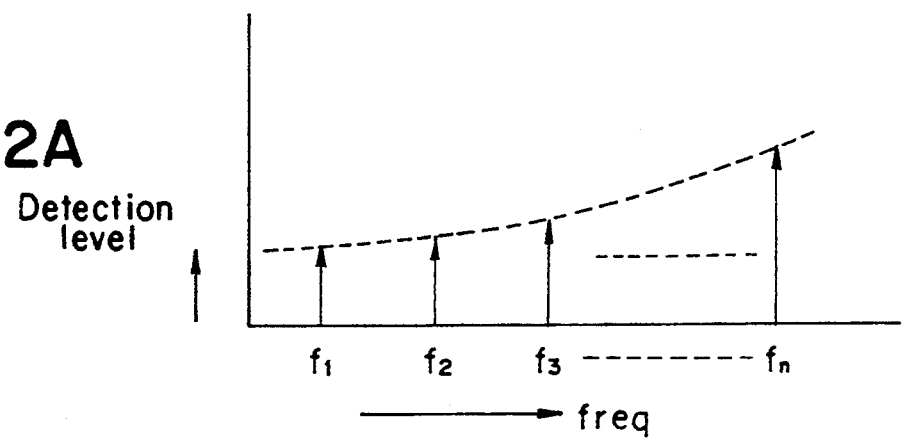
FIGS. 2A, 2B and 2C are a set of views showing output frequency spectrum examples of input video signals together with control signal and output frequency characteristics.
Figure 2B:
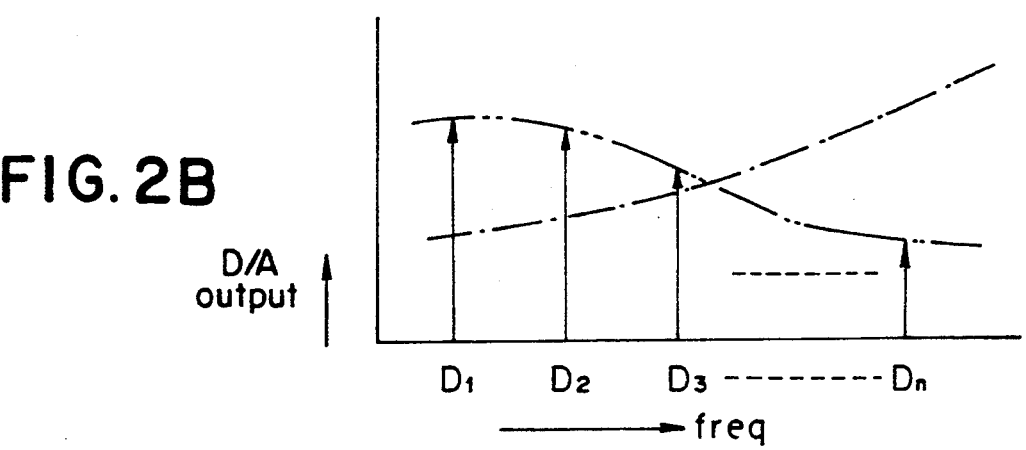

The inventive video signal output circuit of the above construction operates as follows: When a video signal is input illustratively following reproduction from, for example, a laser disk, the detection levels of the spectrum frequencies $f_1, f_2, f_3, \ldots, f_n$ passing through the band-pass filters 9A and sampled at predetermined intervals by detectors 9B are fed to the controller 10, the detection level versus frequency plot being shown in FIG. 2A. On receiving the sampled detection levels, the controller 10 supplies the D/A converters 11 with control data $D_1, D_2, D_3, \ldots, D_n$ indicated by the two-dot chain line in FIG. 2B.

Figure 2C:
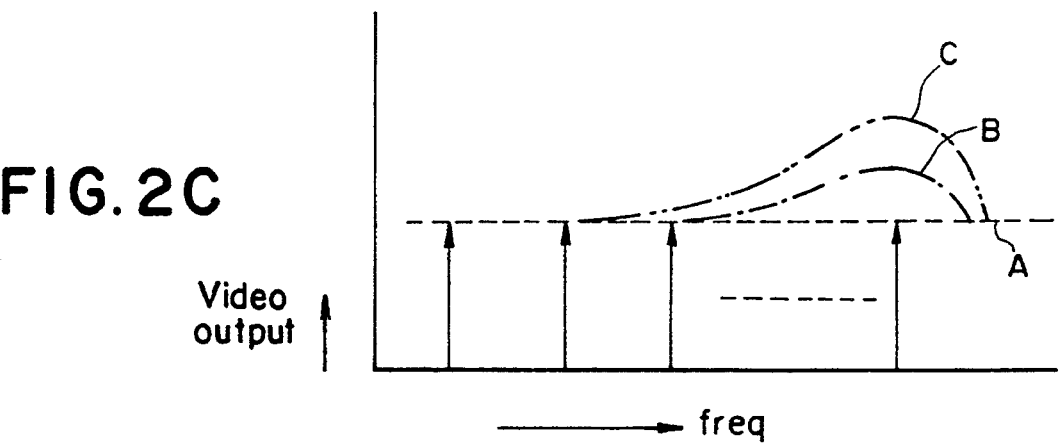

Given the output signals of the D/A converters 11, the equalizer 7 amplifies and expands the input video signal for each of the frequency bands involved. As a result of this, the video signals output by the equalizer 7 are leveled off, as depicted in FIG. 2C.

The above-mentioned video signal input is primarily concerned with input sources having numerous high-pass frequency signal components. If part of the high-pass frequency signal components have been lost through dubbing, or a like operation, the controller 10 outputs control data $D_1, D_2, D_3, \ldots, D_n$ whose levels are expanded on high-bands, as indicated by the one-dot chain line in FIG. 2B. This also provides suitable averaging of the video signal levels. Where the sharpness characteristic is controlled manually, the video signal levels may be controlled in such a manner that a frequency band of about 2.7 MHz is established as shown by dashed line B or by two-dot chain line C in FIG. 2C.

The controller 10 may incorporate a memory device that outputs predetermined equalizing characteristics. With this arrangement, a given input video signal source when selected will prompt control data of the necessary pattern to be output.

The above-described embodiment corrects the frequency characteristic of the luminance signal component in the video signal. An alternative embodiment may also be devised to correct the frequency characteristic of a composite signal.

As described, and according to the invention, the video signal output circuit detects frequency components of the input video signal and controls the equalizer in its video circuitry based on these frequency components. This makes it possible automatically to monitor optimum pictures derived from the video signals supplied by diverse video sources.

While a preferred embodiment of the invention has been described using specific terms, such description is for illustrative purposes only, and it is to be understood that changes and variations may be made without departing from the spirit or scope of the following claims.

What is claimed is:
1. A video signal output circuit comprising:
   detecting means for detecting specific frequencies of the frequency spectrum of an input video signal;
   a signal processor for averaging outputs of said detecting means using a predetermined time constant to obtain respective frequency level values for each detected specific frequency; and
   an equalizer circuit for receiving the frequency level values of said input video signal obtained by said signal processing portion;
   wherein said equalizer circuit performs any one of two operations, one of the two operations being equalizing the level values of the respective specific frequencies of the frequency spectrum of said input video signal to be substantially equal, the other of the two operations being modifying the level values of the respective specific frequencies of the frequency spectrum of said input video signal to have a predetermined frequency spectrum pattern.

2. A video signal output circuit according to claim 1, wherein said detecting means includes:
   a plurality of band-pass filters having different respective pass bands; and
   analog-to-digital converter means for converting outputs of said band-pass filters from an analog to a digital format.

3. A video signal output circuit according to claim 2, wherein the number of said band-pass filters ranges from three to seven, inclusive.

4. A video signal output circuit according to claim 1, wherein said signal processing portion comprises a central processing unit.

5. A video output circuit according to claim 1, wherein said equalizer circuit varies the frequency spectrum of a luminance signal portion of said input video signal.

* * * * *